Feb. 20, 1945.  A. T. HOLISTER  2,369,827
APPARATUS FOR MAKING COIL SPRINGS
Filed Aug. 30, 1943  7 Sheets-Sheet 1

INVENTOR.
Arthur T. Holister
BY
Carlos G. Stratton
ATTORNEY.

Feb. 20, 1945.  A. T. HOLISTER  2,369,827
APPARATUS FOR MAKING COIL SPRINGS
Filed Aug. 30, 1943  7 Sheets-Sheet 2
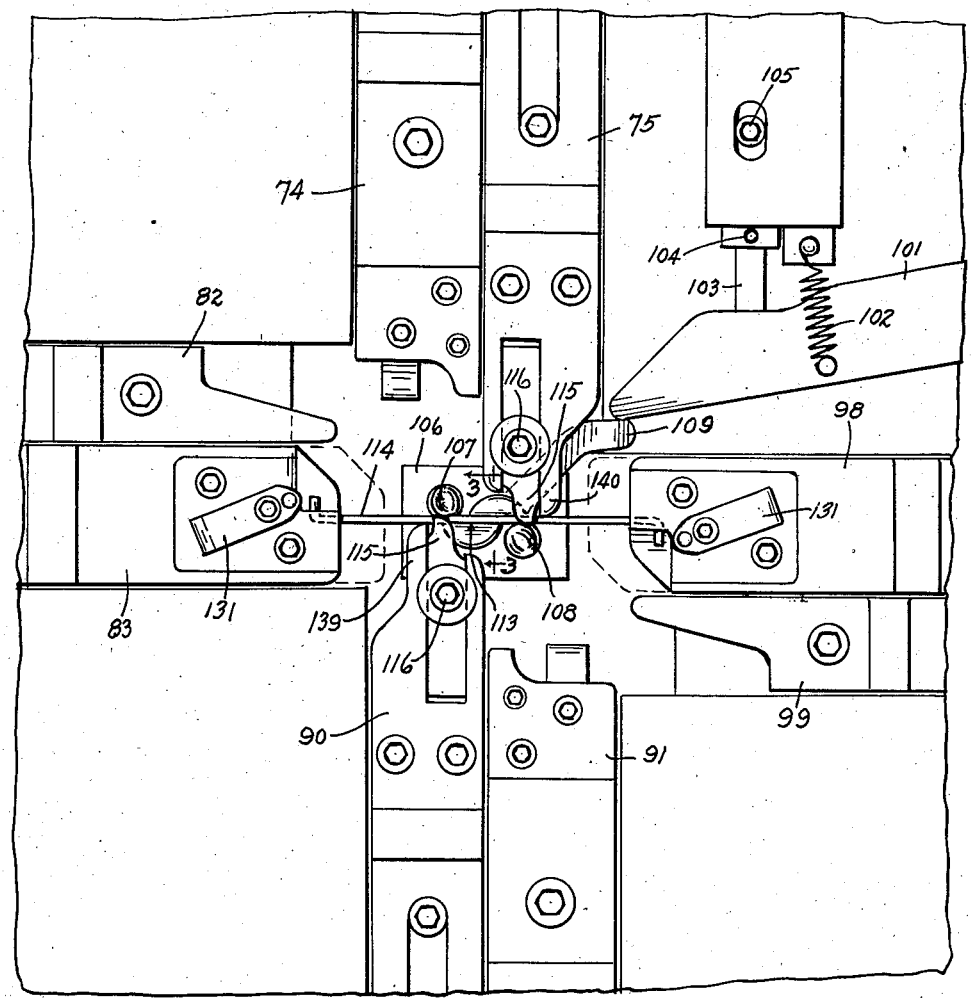
INVENTOR.
Arthur T. Holister
BY Carlos G. Stratton
ATTORNEY.

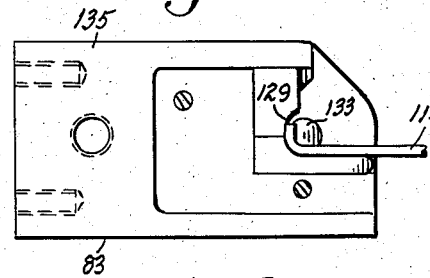
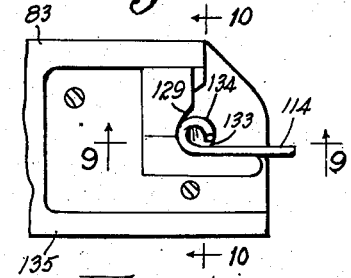
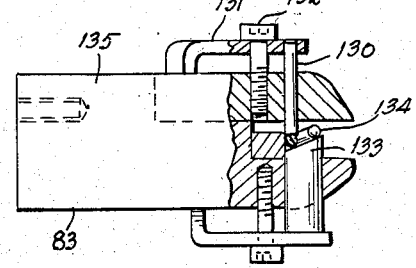
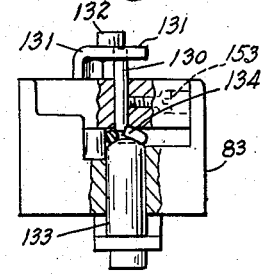
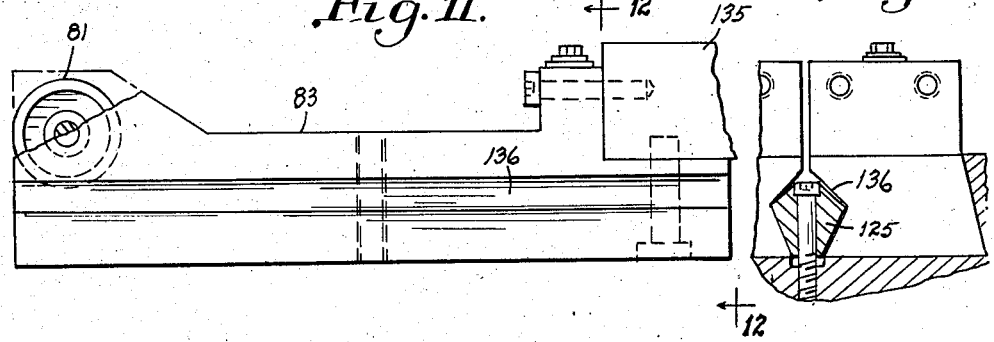
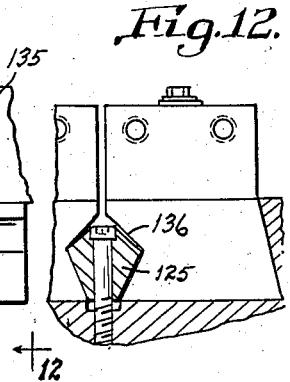
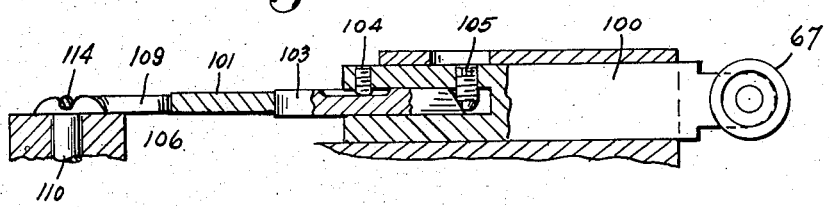

Feb. 20, 1945.  A. T. HOLISTER  2,369,827
APPARATUS FOR MAKING COIL SPRINGS
Filed Aug. 30, 1943  7 Sheets-Sheet 4

INVENTOR.
Arthur T. Holister
BY Carlos G. Stratton
ATTORNEY.

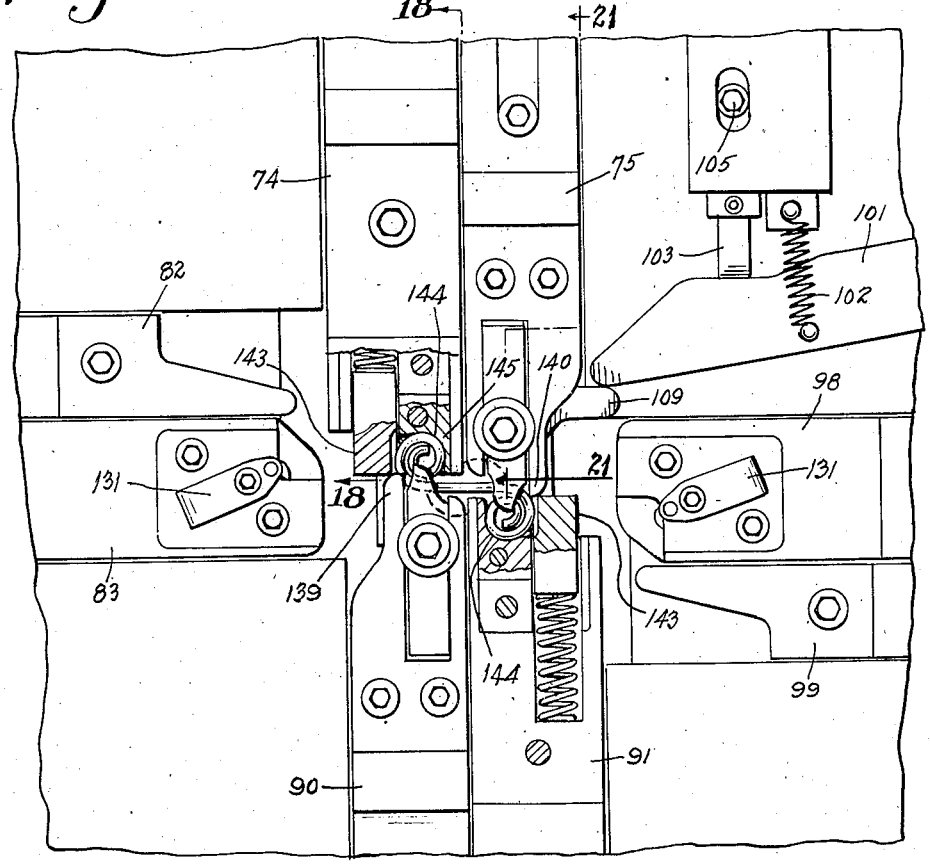
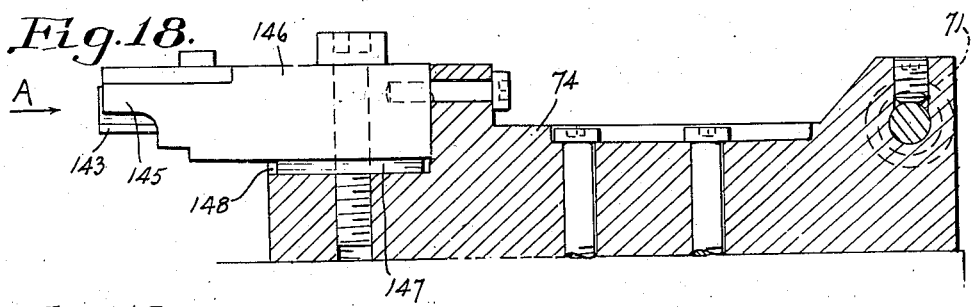
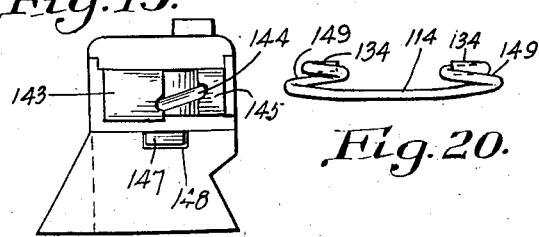

Feb. 20, 1945.     A. T. HOLISTER     2,369,827
APPARATUS FOR MAKING COIL SPRINGS
Filed Aug. 30, 1943     7 Sheets-Sheet 6
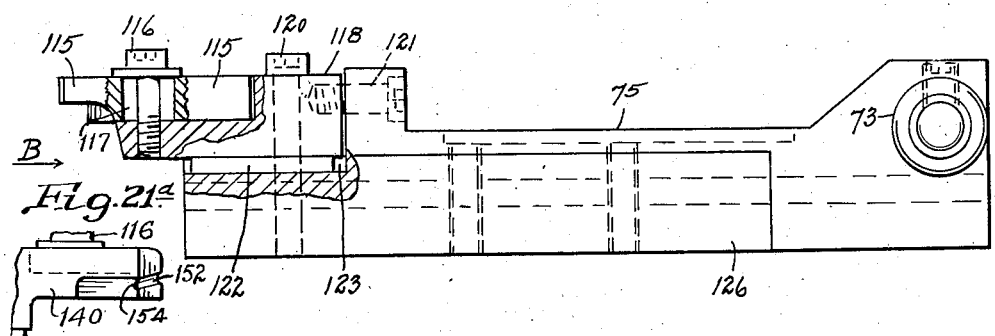
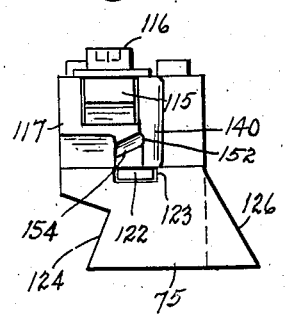
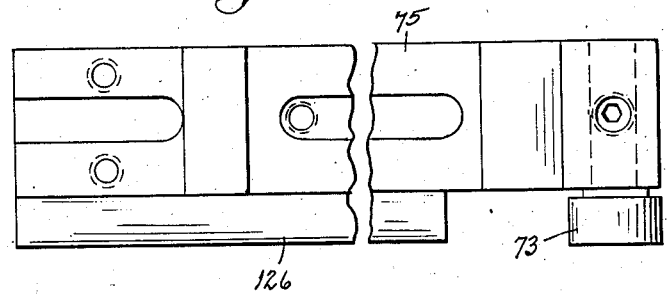
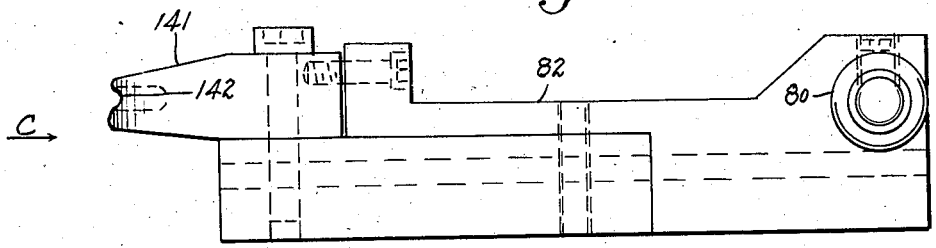
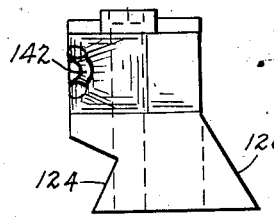
INVENTOR.
Arthur T. Holister
BY Carlos G. Stratton
ATTORNEY.

INVENTOR.
Arthur T. Holister
BY Carlos G. Stratton
ATTORNEY.

Patented Feb. 20, 1945

2,369,827

UNITED STATES PATENT OFFICE 2,369,827

APPARATUS FOR MAKING COIL SPRINGS

Arthur T. Holister, Los Angeles, Calif.

Application August 30, 1943, Serial No. 500,512

20 Claims. (Cl. 140—104)

My invention relates to an apparatus and process for making coil springs, and the principal object of the invention is to provide a machine of such a character that will provide coils at the opposite ends of a single wire.

Another object of the invention is to provide such coils by operating different parts of the machine to produce successive bends in the wire.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 2 is an enlarged, broken plan view of the central portion of Fig. 1.

Fig. 3 is an enlarged, broken section, taken on the line 3—3 of Fig. 2.

Fig. 4 is a perspective view of the top of the element shown in section in Fig. 3.

Fig. 4a is a broken elevation of the element shown in Fig. 4.

Fig. 5 is a perspective view of a lever shown in elevation in Fig. 3.

Fig. 6 is a perspective view of a length of stock to be operated upon by the present machine.

Fig. 7 is a plan view of a coiling element.

Fig. 8 is a view of the element shown in Fig. 7 at a subsequent time in the operation of the machine.

Fig. 9 is a view partly in elevation and partly in section taken on the line 9—9 of Fig. 8.

Fig. 10 is a section taken on the line 10—10 of Fig. 8.

Fig. 11 is a side elevation, broken away, of a mounting for a wire coiling element.

Fig. 12 is an end elevation along the offset line 12—12 of Fig. 11.

Fig. 13 is an enlarged section taken along offset line 13—13 of Fig. 1.

Fig. 14 is a perspective view of a length of stock which has received its initial end bends.

Fig. 17 is also a view similar to Fig. 15, but showing parts thereof in section and showing parts of the machine in their more advanced wire bending positions.

Fig. 18 is a section taken on the line 18—18 of Fig. 17.

Fig. 19 is an end view of the bending element shown in Fig. 18, looking in the direction of arrow A thereof.

Fig. 20 is a side elevation of the finished product of the present machine.

Fig. 21 is a section taken along the line 21—21 of Fig. 17, partly in elevation.

Fig. 21a is an elevation of the left end of Fig. 21, but looking in the opposite direction.

Fig. 22 is a plan view of the element shown in Fig. 21, but without the forming head thereon.

Fig. 23 is an end elevation looking in the direction of the arrow B of Fig. 21.

Fig. 24 is a side elevation looking in the direction of the arrows 24—24 of Fig. 15.

Fig. 25 is an end elevation looking in the direction of arrow C of Fig. 24.

Figure 1:
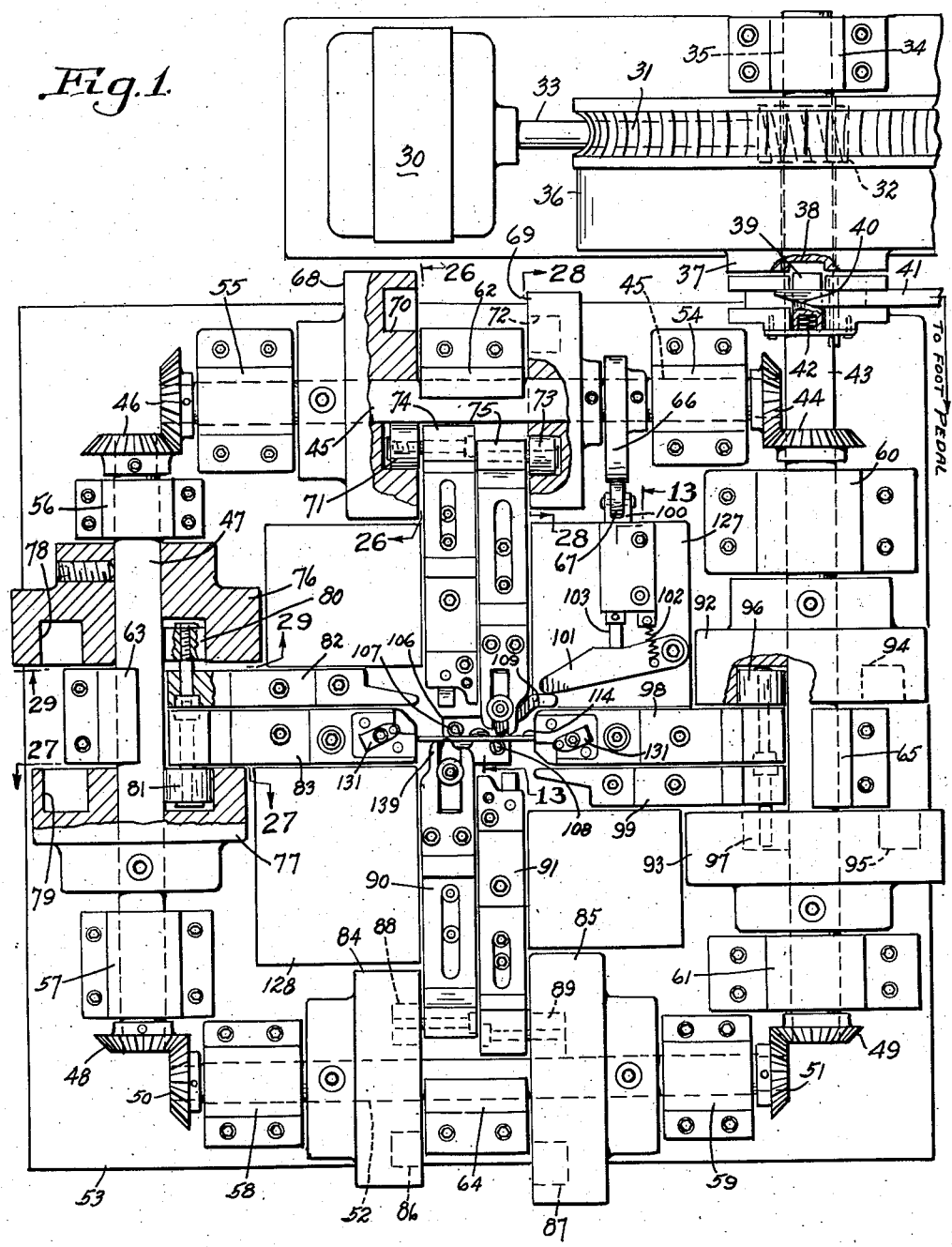
Fig. 1 is a plan view, partly broken away, illustrating operative mechanism comprised in the present invention.

Referring more in detail to the drawings, the reference number 30 designates a motor that is connected to drive a worm gear 31 through the intermediary of a worm 32 on the shaft 33 of the motor 30. A bearing 34 journals shaft 35 upon which the worm gear 31 is mounted. A drum 36 is mounted on the side of the gear 31 and carries a clutch head 37 provided with a recess 38 in which a spring urged dog 39 is adapted to engage. The dog 39 has a beveled shoulder 40 that is engaged by the tapered end of a rod 41 which in turn is actuated by suitable means, such as a foot pedal (not shown). A coil spring 42 urges the dog 39 into engagement with the clutch head 37, while the rod 41 is arranged to move the dog 39 out of such engaging position, when the operative means is actuated. The dog 39 connects the continuously rotating clutch head 37 with shaft 43, when desired by the operator. The shaft 43 drives a right angularly disposed shaft 45 by means of beveled gears 44. By means of beveled gears 46 the shaft 45 drives a therewith right angularly disposed shaft 47. Beveled gears 48 and 49 on shafts 47 and 43 respectively conjointly drive beveled gears 50 and 51 on shaft 52. The shafts 43, 45, 47 and 52 are arranged substantially in a square upon a table plate 53. Bearings 54 and 55 are used to journal the shaft 45. The bearings 56 and 57 are employed to journal the shaft 47. The bearings 58 and 59 journal the shaft 52, while bearings 60 and 61 journal the shaft 43.

Offset bracing clips 62, 63, 64 and 65 are respectively arranged alongside shafts 45, 47, 52 and 43. A cam 66, keyed to shaft 45, is arranged to engage a roller 67 hereinafter more fully described. Cam wheels 68 and 69 face each other upon the shaft 45. Cam groove 70 on a face of the wheel 68, is engaged by a roller 71, while a cam groove 72 on the face of the cam wheel 69 is engaged by a roller 73. The roller 71 is pivotally mounted upon reciprocating die 74, while the roller 73 is pivotally mounted upon reciprocating die 75. Cam wheels 76 and 77 are mounted face to face upon the shaft 47. The wheels 76 and 77 have cam-shaped grooves 78 and 79 which are engaged by rollers 80 and 81 respectively. The rollers 80 and 81 are pivotally mounted upon reciprocating dies 82 and 83 respectively.

Cam wheels 84 and 85 are mounted face to face upon shaft 52. Cam-shaped grooves 86 and 87 are respectively arranged in the faces of the wheels 84 and 85 respectively. Rollers 88 and 89 operate in the grooves 86 and 87 and are in turn pivotally mounted upon reciprocating dies 90 and 91. Cam wheels 92 and 93 are arranged face to face upon the shaft 43. Grooves 94 and 95 in the faces of the wheels 92 and 93 carry rollers 96 and 97 which are respectively pivotally mounted upon reciprocating dies 98 and 99.

The roller 67 hereinbefore referred to, is mounted upon a carrier 100 that is pushed in one direction by means of the cam 66 engaging the roller 67. A dog 101 is maintained under tension by an extension spring 102. An end 103 of the carrier 100 engages the dog 101. Thereby the spring 102 urges the carrier 100 counter to the aforementioned pushing action of the cam 66. Set-screws 104 and 105 (see Fig. 13) maintain the end 103 in adjusted positions.

A central block 106 carries two fixed arbors 107 and 108. A lever 109 carries a spindle 110 that is rotatably supported in a bore 112 in the block 106. Adjacent the axis of the lever 109 is a kerf 113 for engageably supported stock 114. When the stock 114 is inserted in the kerf 113 and pressure is applied to the lever 109, the stock is held against arbors 107 and 108 in a binding relation, whereby to hold the stock firmly during coiling operations. The stock upon which the work is to be done, is shown in perspective in Fig. 6.

Dies 75 and 90 are connected to initially move up to an engaging position with the stock 114, to support the wire during the end eye coiling operation. It will be noticed that the dies 75 and 90 engage the wire on the opposite side from the arbors 108 and 107 respectively, and on top of the wire so as to prevent vertical or lateral movement of the stock in either direction. The dies 75 and 90 are substantially identical but connected to move in opposite directions. As shown in Figs. 21 to 23, these dies have an adjustable nose piece 115 that is held in its adjusted positions upon a shoulder block 118 by a bolt 116 that is slidable lengthwise of a slot 117 in the nose piece. Bolts 120 and 121 maintain the shoulder block 118 upon the main body of the die. A depending key 122 on the shoulder block 118 slides in a keyway 123 in the body of the die 75. The side of the die 75 has a complementary dove-tail groove 124 for engaging a dove-tail guide, such as shown at 125 in Fig. 12. A beveled side 126 on the die 75 fits in an undercut portion under a block 127 on the plate 53. Block 128 also on the plate 53 is undercut to receive a beveled edge 126 on the die 90. The nose pieces 115 of the dies 75 and 90 overlap the stock 114, as shown in Fig. 2.

While the stock is so engaged between the nose pieces 115 and the arbors 107 and 108, and additionally held in such binding position by the kerf 113, dies 83 and 98 move forwardly endwise of the stock 114, as shown in Fig. 2. The dies 83 and 98 are substantially identical except that they are mounted to reciprocate in opposite directions. These dies have an arbor 133 adjacent an arcuate recess 129. Depending pin 130 in a bracket 131 is adjusted vertically by a bolt 132. A set screw 153 holds the pin 130 in adjusted positions. The pin 130 maintains the end of the stock down against the arbor 133 and against the wall of the recess 129. It will be noticed that the upper face of the arbor 133 is inclined (see Fig. 9). By this means, movement of the dies 83 and 98 toward each other coil the ends of the stock to conform with the recess 129 and cause the coiled ends 134 to be coiled upwardly out of the plane of the body of the stock 114.

The dies 83 and 98 have shoulder blocks 135 that carry the coiling nose hereinbefore described. The dies 83 and 98 have dove-tail undercuts 136 engaging dove-tail guides 125. The stock at this point of the operation is shown in Fig. 14.

Figure 15:
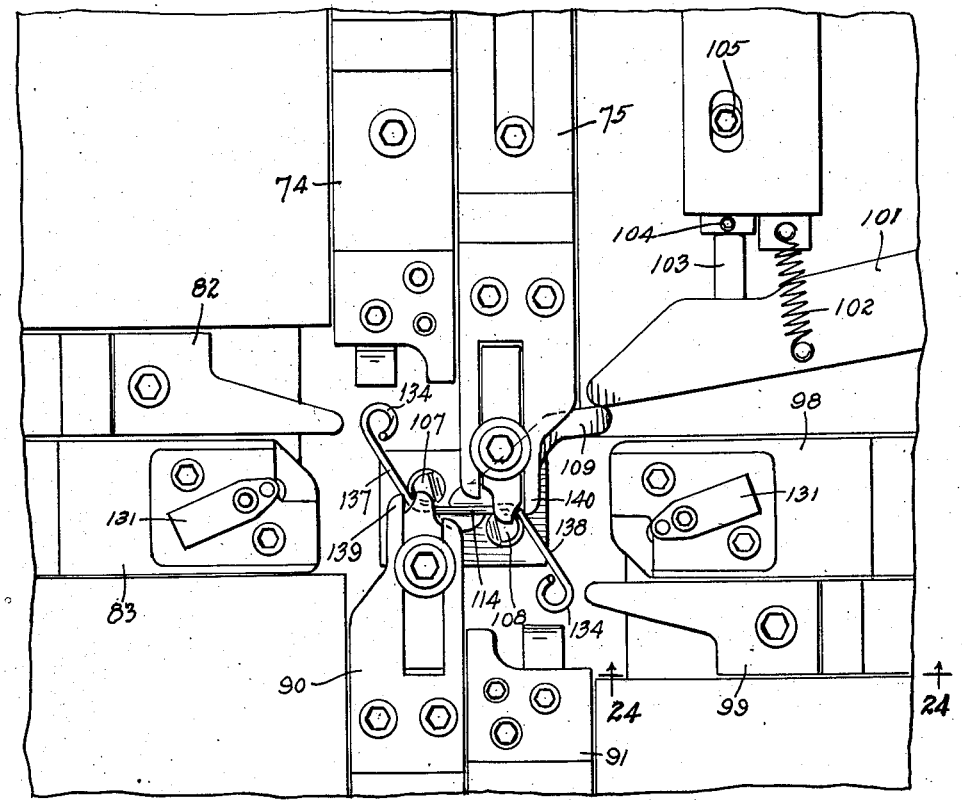
Fig. 15 is a view similar to Fig. 2, but showing the machine in a subsequent step in the wire bending operation.
Figure 16:
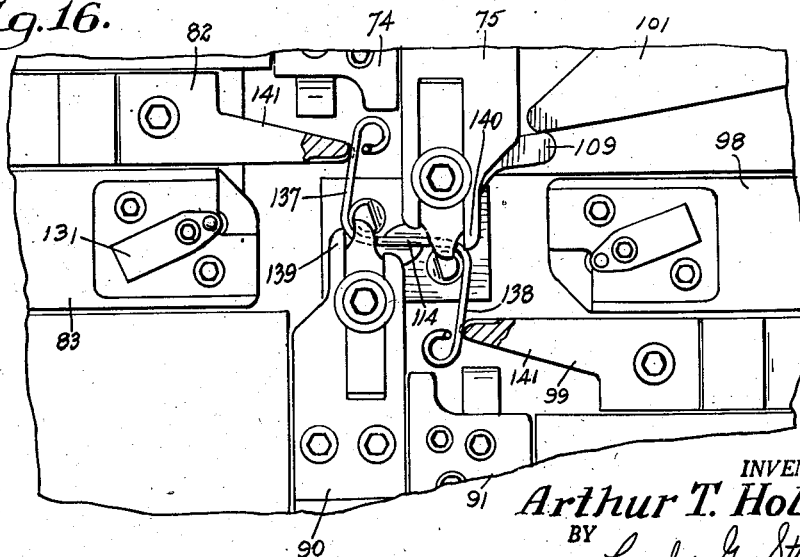
Fig. 16 is a view of a reduced portion of Fig. 15, showing the machine in a still further advanced operating position.
Figure 26:
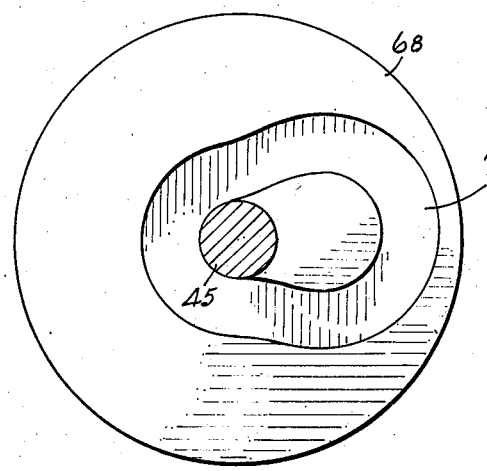
Fig. 26 is a section taken along the line 26—26 of Fig. 1.
Figure 27:
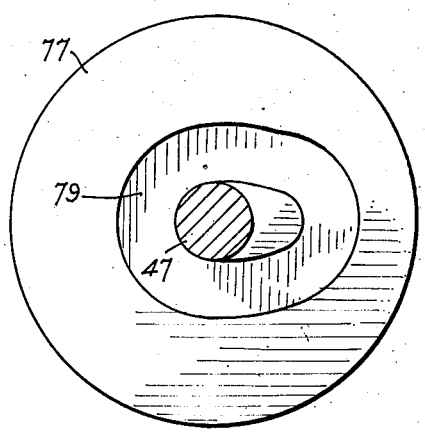
Fig. 27 is a section taken along the line 27—27 of Fig. 1.
Figure 28:
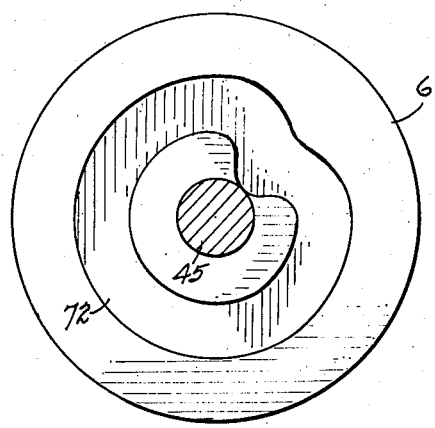
Fig. 28 is a section taken along the line 28—28 of Fig. 1.
Figure 29:
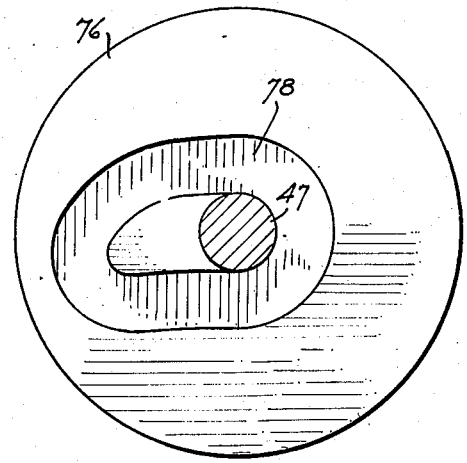
Fig. 29 is a section taken along the line 29—29 of Fig. 1.

The dies 83 and 98 are thereupon retracted from the stock, and the dies 75 and 90 then continue their forward movement against the stock 114, bending the ends 137 and 138 upwardly from the body of the stock 114 by reason of the upwardly spiralling grooves 119 on the arbors 107 and 108. This bending is effected by grooves 152 (Fig. 21a) in the side of lips 139 and 140 that extend alongside the nose pieces 115 and by means of the therewith connecting grooves 154 in the end faces of the dies 75 and 90. The nose pieces 115 are arranged to move past the arbors 107 and 108, as shown in Figs. 15 and 16. The upwardly bent ends 137 and 138 are thereby moved into the paths of the dies 82 and 99. The dies 82 and 99 thereupon move forward, still further bending the ends 137 and 138 beyond a right angle, as shown in Fig. 16. The dies 82 and 99 are similar in construction, but are mounted to move in opposite directions. The nose portions 141 of the dies 82 and 99 have grooves 142 for engaging the ends 137 and 138.

The dies 82 and 99 are then withdrawn, permitting the bent ends 137 and 138 to spring back to approximately 90 degree angles with the central portion of the stock. At this point in the operation, the dies 74 and 91 move forward, coiling the ends 137 and 138, as shown in Fig. 17.

The dies 74 and 91 are similar in construction except that they are mounted to move in opposite directions. These dies have spring urged fingers 143 that aid in guiding the eyes 134 at the ends of the stock into recesses 144 in nose portions 145 of the dies 74 and 91. The nose 145 is an integral part of a shoulder block 146, which has a depending key 147 slidable in a keyway 148, in the dies 74 and 91. The spring-urged fingers 143 are engaged by the lips 139 and 140 which cause the spring-urged fingers to recede after the coiling of the stock is effected within the recesses 144. The recesses 144 are upwardly inclined as indicated in Fig. 19. The finished product is shown in Fig. 20, provided with upwardly inclined end coils 149 from a substantially horizontal body portion 114. It will also be noticed in Fig. 20 that the tops of the eyes 134 are substantially parallel with the bottom of the body portion 114.

A number of bolts indicated in the drawings have not been numbered. In connection with the dies, they indicate means for bolting two parts of the dies together, which is believed to be clear to anyone skilled in the art, without further description and illustration. It is also to be understood that the coiling may be downward as well as upward, since it is desired that the product shall have offset coils, with respect to the body portion of the stock.

In the operation of my machine, the motor 30 is operating continuously and the present wire coiling machine is operated at intervals as desired by the operator, who actuates the foot pedal (not shown) to control the clutch dog 39.

The initial stock 114 is manually fed into the kerf 113. The machine is then actuated, causing the cam 66 and roller 67 to move the dog 101 to a position in which the lever 109 causes the stock to bind against the arbors 107 and 108.

Dies 75 and 90 then move forward whereby the lips 139 and 140 engage the stock 114 on both sides and on the top. The dies 83 and 98 are then actuated to move toward each other, producing the relatively small helical eyes 134 at the ends of the stock.

The dies 75 and 90 are then moved forward still further, bending the ends 137 and 138 of the stock into the paths of the dies 82 and 99. The dies 82 and 99 then move the stock ends 137 and 138 past 90 degree angles, so that the wire may spring back to 90 degree angles. The bent ends 137 and 138 project toward the dies 74 and 91.

The dies 74 and 91 are moved forward after the dies 82 and 99 have been withdrawn. The dies 74 and 91 helically coil the portions of the bent ends between the eyes 134 and the bends for the ends 137 and 138 and render the tops of the eyes parallel with the body portion of the wire 114, producing the finished coil on the ends of the stock. The finished product is thereupon manually removed from the kerf 113.

Each of the foregoing successive steps aids in producing the final end coils on the stock, and each step continues the helical arrangement of the end coils.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In apparatus to form coils on the ends of a single strand of wire, substantially oppositely disposed die means, mechanism connected to move the die means towards and away from each other simultaneously, means to support and hold wire stock with its end portions extending towards the dies, the dies having arcuate recesses arranged to coil the wire ends as the dies are moved towards each other, said supporting and holding means including separate die means operable to hold the stock during the coiling operation and subsequently movable to bend the stock and move the end portions thereof away from the wire coiling dies.

2. In apparatus to form coils on the ends of a single strand of wire, substantially oppositely disposed die means, mechanism connected to move the die means towards and away from each other simultaneously, means to support and hold wire stock with its end portions extending towards the dies, the dies having arcuate, inclined recesses arranged to coil opposite ends of the wire out of the plane of the main body of the stock, as the dies are moved towards each other, said supporting and holding means including separate die means operable to hold the stock during the coiling operation and subsequently movable to bend the stock and move the end portions thereof away from the wire coiling dies.

3. In apparatus to form coils on the ends of a single strand of wire, substantially oppositely disposed die means, mechanism connected to move the die means towards and away from each other simultaneously, means to support and hold wire stock with its end portions extending towards the dies, the dies having recesses with arcuate end portions and having underneath and overhanging means arranged to maintain wire ends in the recesses, as the dies are moved towards each other, to bend opposite ends of the wire simultaneously, said supporting and holding means including separate die means operable to hold the stock while the ends thereof are being bent and subsequently movable to carry the bent ends of the stock away from the wire bending dies.

4. In apparatus to form coils on the ends of a single strand of wire, two pairs of substantially oppositely disposed die means, the pairs being arranged to move along axes at angles to each other, mechanism connected with one of the pairs to move one die means away from the other and generally towards each other to confining positions laterally of the stock, preventing lateral displacement of the stock, means to support wire stock with its end portions extending towards the dies in the other pair, and mechanism connected to move the latter pair of dies away from each other and towards each other to positions endwise of the stock, the latter dies having arcuate recesses arranged to coil both ends of the wire as the latter dies are moved towards each other, and means for effecting further movement of the other pair of dies to bend and move the end portions of the stock away from the wire coiling dies.

5. In apparatus to form coils on the ends of a single strand of wire, two pairs of substantially oppositely disposed die means, the pairs being arranged to move along axes at angles to each other, mechanism connected with one of the pairs to move one die means away from the other and generally towards each other to confining positions laterally of the stock, preventing lateral displacement of the stock, means to support wire stock with its end portions extending towards the dies in the other pair, and mechanism connected to move the latter pair of dies towards each other and towards the ends of the stock, the latter dies having arcuate recesses arranged to coil both ends of the wire as the latter dies are moved towards each other, the latter mechanism being connected to withdraw the dies away from each other, and the former mechanism being arranged to move the laterally disposed die means further in the direction of their original movements generally towards each other, the latter dies being arranged to bend and move the wire stock in opposite directions away from the wire coiling dies, by said further movement.

6. In apparatus to form coils on the ends of a single strand of wire, two pairs of substantially oppositely disposed die means, the pairs being arranged to move along axes at angles to each other, mechanism connected with one of the pairs to move one die means away from the other and generally towards each other to confining positions laterally of the stock, relatively stationary arbors arranged substantially opposite the last-mentioned dies with at least a portion of such dies movable alongside the arbors, to bend wire stock therearound at spaced points, mechanism connected to move the other pair of dies towards each other and towards the ends of the stock, the latter dies having arcuate recesses arranged to coil both ends of the wire as the latter dies are moved towards each other, the latter mechanism being connected to withdraw the dies away from each other and the former mechanism being arranged to move the laterally disposed die means further in the direction of their original movements generally towards each other, bending the stock around the arbors and move the coiled ends of the wire away from the wire coiling dies.

7. In apparatus to form coils on the ends of a single strand of wire, a substantially central stock holding means, three pairs of die means movable inwardly to and outwardly from the positions of stock in such holding means, two of the pairs being mounted to move in substantially parallel paths and the other pair being movable along axes at angles to the paths of the other two pairs of dies, mechanism connected to move the angular moving pair to positions laterally of the stock to confine same, mechanism connected to move one of the parallel pairs towards the ends of the stock while it is so confined, the latter pair of dies being arranged to coil the ends of the stock, the first-mentioned mechanism being arranged to move the angularly arranged pair in a further forward movement, the pair of dies thus further actuated being arranged to bend the ends of the wire stock into the paths of the third pair of dies, and mechanism connected to move the third pair of dies forward, the latter dies being arranged to bend the wire further.

8. In apparatus to form coils on the ends of a single strand of wire, a substantially central stock holding means, three pairs of die means movable inwardly to and outwardly from the positions of stock in such holding means, mechanism connected to move one pair to positions laterally of and at opposite sides of the stock to confine the same, mechanism connected to move another pair endwise of the stock while the wire is so confined, the latter pair of dies being shaped to initially coil the ends of the stock, the first-mentioned mechanism being connected to move the said laterally disposed pair of dies in a further forward movement, the pair of dies thus further actuated being arranged to thereby bend the stock at angles and endwise into the paths of the third pair of dies, the bends being inward at predetermined distances from the initial end coils, and mechanism connected to move the third pair of dies forward, the latter dies being shaped to coil the bent ends of the stock by their forward movement.

9. In apparatus to form coils on the ends of a single strand of wire, relatively stationary arbors arranged in staggered positions relative to the operative position of wire stock, for bending the wire stock therearound, three pairs of dies movable inwardly to and outwardly from wire stock positioned relative to the arbor means, mechanism connected to move one pair of dies to staggered positions with respect to wire stock arranged relative to the arbors, the latter pair of dies being arranged generally opposite the arbors respectively, to confine the wire stock, mechanism connected to move another pair endwise of the stock while the wire is so confined, the latter pair of dies being shaped to initially coil the ends of the stock, the first-mentioned mechanism being connected to move the stock-confining dies further forward, bending the stock around the arbors in opposite directions and into the paths of the third pair of dies, the bends being at predetermined distances inward from the initial end coils, and mechanism connected to move the third pair of dies forward, the latter dies being shaped to coil the angularly bent ends of the stock around the arbors, from the initial end coils to the bends, by the forward movement of the latter dies.

10. In apparatus to form coils on the ends of a single strand of wire, three pairs of dies movable inwardly to and outwardly from a space for wire stock in the apparatus, mechanism connected to move one pair to positions laterally of and at opposite sides of the stock to confine the same, mechanism connected to move another pair endwise of the stock while the wire is so confined, the latter pair of dies having inclined, arcuate recess means to initially, helically coil the ends of the stock, the first-mentioned mechanism being connected to move the said laterally disposed pair of dies in a further forward movement, the pair of dies thus further actuated being shaped to bend the stock at an angle and inclined with respect to the central portion of the wire stock, and bending the stock into the paths of the third pair of dies, the bends being inward at predetermined distances from the initial end coils, the latter dies being shaped to helically coil the angularly bent ends of the stock between the initial end coils and the bends, producing helical coils at the ends of the wire stock.

11. In apparatus to form coils on the ends of a single strand of wire, arbors arranged for bending wire stock therearound, spring-urged means disposed to resiliently bind wire stock against the arbors, three pairs of dies movable inwardly to and outwardly from wire stock positioned relative to the arbor means, mechanism connected to move one pair of dies to positions generally opposite the arbors respectively, to confine the wire stock, mechanism connected to move another pair endwise of the stock while the wire is so confined, the latter pair of dies being shaped to initially coil the ends of the stock, the first-mentioned mechanism being connected to move the stock-confining dies further forward, bending the stock around the arbors and into the paths of the third pair of dies, the latter dies being arranged to coil the wire portions in their paths around the arbors, by the forward movement of the latter dies.

12. In apparatus to form coils on the ends of a single strand of wire, arbors arranged for bending wire stock therearound, three pairs of dies movable inwardly to and outwardly from wire stock positioned relative to the arbor means, mechanism connected to move one pair of dies to positions generally opposite the arbors respectively, to confine the wire stock, mechanism connected to move another pair endwise of the stock while the wire is so confined, the latter pair of dies being shaped to initially coil the ends of the stock, the first-mentioned mechanism being connected to move the stock-confining dies further forward, bending the stock around the arbors and into the paths of the third pair of dies, the latter dies being arranged to coil the wire portions in their paths around the arbors, the latter dies having spring-urged dogs disposed to be resiliently moved forward to confine the wire during their first coiling movement, the spring-urged dogs being in the path of the dies actuated by the first-mentioned mechanism and being arranged to yield by the forward movement of the latter dies, the dogs being disposed to continue their confining position during such yielding movement.

13. In apparatus to form coils on the ends of a single strand of wire, a substantially central stock holding means, four pairs of die means movable inwardly to and outwardly from the positions of stock in such holding means, mechanism connected to move one pair of dies to positions in which they engage both sides and the top of the stock, to confine the wire stock, mechanism connected to move another pair endwise of the stock while the wire is so confined, the latter pair of dies being shaped to initially coil the ends of the stock, the first-mentioned mechanism being connected to move the said laterally disposed pair of dies in a further forward movement, the pair of dies thus further actuated being arranged to bend the ends of the wire stock into the paths of the third pair of dies, mechanism connected to move the third pair of dies forward, the third set of dies being arranged when moved forward to bend the wire ends greater than 90° and being retractile to release the bent ends for them to spring back to substantially 90° to a position projecting generally toward the fourth set of dies, the latter dies being shaped to coil the bent ends of the stock by their forward movement, and mechanism connected to move the fourth set of dies forwardly to their said coiling positions.

14. In apparatus to form coils on the ends of a single strand of wire, arbors arranged for bending wire stock therearound, lever means connected to bind wire stock against the arbors, three pairs of dies movable inwardly to and outwardly from wire stock positioned relative to the arbor means, mechanism connected to move one pair of dies to positions generally opposite the arbors respectively, to confine the wire stock, mechanism connected to move another pair endwise of the stock while the wire is so confined, the latter pair of dies being shaped to initially coil the ends of the stock, the first-mentioned mechanism being connected to move the stock-confining dies further forward, bending the stock around the arbors and into the paths of the third pair of dies, the latter dies being arranged to coil the wire portions in their paths around the arbors, by the forward movement of the latter dies.

15. In apparatus to form coils on the ends of a single strand of wire, arbors arranged for bending wire stock therearound, three pairs of dies movable inwardly to and outwardly from wire stock positioned relative to the arbor means, mechanism connected to move one pair of dies to positions generally opposite the arbors respectively, to confine the wire stock, mechanism connected to move another pair endwise of the stock while the wire is so confined, the latter pair of dies being shaped to initially coil the ends of the stock, the first-mentioned mechanism being connected to move the stock-confining dies further forward, bending the stock around the arbors and into the paths of the third pair of dies, the latter dies being arranged to helically coil portions of the wire in their paths around the arbors and to limit the ends of the coils to planes substantially parallel with the central portion of the wire between the end coils.

16. In apparatus to form coils on the ends of a single strand of wire, arbors arranged for bending wire stock therearound, a plurality of pairs of dies movable inwardly to and outwardly from the positions of wire stock relative to the arbor means, means for gripping wire in its position relative to the arbors, mechanism connected to move a pair of the dies endwise of the stock while the wire is so gripped, the latter pair of dies being shaped to initially coil the ends of the stock, mechanism connected to move another pair of dies to positions bending the stock around the arbors and into the paths of still another pair of dies, the bends being inward at predetermined distances from the initial end coils, and mechanism connected to move the third pair of dies forward, the latter dies being shaped to coil the bent ends of the stock by their forward movement.

17. In apparatus to form coils on the ends of a single strand of wire, means for gripping wire, a plurality of pairs of dies movable inwardly to and outwardly from the positions of wire stock in the gripping means, mechanism connected to move a pair of the dies endwise of the stock while the wire is so gripped, the latter pair of dies having upwardly inclined notches to initially coil the ends of the stock helically, stationary arbor means having a helical groove, another pair of dies being connected to bend the ends of the stock into the helical groove in the arbor means, the ends being bent into the paths of still another pair of dies, and mechanism connected to move the third pair of dies forward, the latter dies being shaped to helically coil the bent ends and thereby complete the end coils, by their forward movements.

18. In apparatus to form coils on the ends of a single strand of wire, relatively stationary arbors arranged in staggered positions relative to the operative position of wire stock, for bending the wire stock therearound, a plurality of pairs of dies movable inwardly to and outwardly from the positions of wire stock relative to the arbor means, a spring-urged lever arranged to grip wire stock so disposed, mechanism connected to move one pair of dies to staggered positions with respect to wire stock arranged relative to the arbors, the latter pair of dies being arranged generally opposite the arbors respectively, to confine the wire stock, mechanism connected to move another pair endwise of the stock while the wire is so confined, the latter pair of dies having inclined, curved notches of relatively small diameter to initially coil relatively small helical coils at the ends of the stock, said coils being of less diameter than the bases of the arbors, the arbors having helical grooves, the first-mentioned mechanism being connected to move the stock-confining dies further forward, bending the stock into the helical arbor grooves in opposite directions and into the paths of the third pair of dies, the bends being at predetermined distances inward from the initial end coils, the third pair of dies having inclined notches and movable forward to bend the bent ends into the path of a fourth pair of dies, and mechanism connected to move the fourth pair of dies forward, the latter dies having inclined, arcuate grooves arranged to coil the bent ends of the stock helically around the arbors by their forward movement, the reduced, initial end coils being moved above the bases of the arbors during this final coiling.

19. In an apparatus to form coils on the ends of a single strand of wire, substantially oppositely disposed dies constructed and arranged to coil both ends of the wire simultaneously as the dies are moved towards each other, mechanism connected to move the dies towards and away from each other simultaneously, and means to support and hold the wire stock intermediate its ends at spaced points including a pair of relatively stationary arbors and a separate pair of dies simultaneously movable towards and from the arbors and operable, by movement towards the arbors, to hold the wire against the same while the ends of the wire are being coiled and, by further movement, to bend the wire around the arbors and carry the end portions of the wire away from the wire coiling dies.

20. In an apparatus to form coils on the ends of a single strand of wire, substantially oppositely disposed dies constructed and arranged to coil both ends of the wire simultaneously as they are moved toward each other, mechanism connected to move the dies toward and away from each other simultaneously, means to support and hold the wire stock intermediate its ends at spaced points including a pair of relatively stationary arbors and a separate pair of dies located at opposite sides of the arbors and arranged at an angle to said dies and simultaneously movable toward and from the arbors and operable, by movement toward the arbors, to hold the wire against the same while the ends of the wire are being coiled and effective by further movement to bend the wire around the arbors in opposite directions and carry the end portions of the wire away from the wire coiling dies.

ARTHUR T. HOLISTER.